United States Patent Office 2,987,418
Patented June 6, 1961

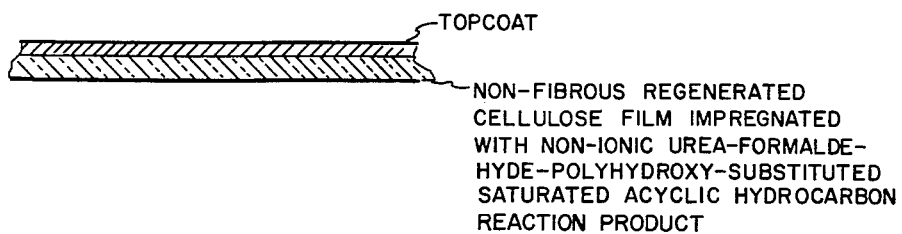
INVENTOR.
WILLIAM M. WOODING

2,987,418
NON-FIBROUS REGENERATED CELLULOSE FILM CARRYING MODIFIED UREA-FORMALDEHYDE RESIN AS ANCHOR AGENT
William M. Wooding, Old Greenwich, Conn., assignor to American Cyanamid Company, New York, N.Y., a corporation of Maine
Filed Nov. 15, 1956, Ser. No. 622,245
7 Claims. (Cl. 117—72)

The present invention relates to non-fibrous regenerated cellulose film uniformly impregnated with a small but effective amount of a normally water-soluble, substantially non-ionic, thermosetting, resinous urea-formaldehyde-alkanepolyol reaction product as anchor agent and to such impregnated film carrying a subsequently-applied topcoat material. The invention includes methods for applying the anchoring resin and the topcoat to the film.

Non-fibrous regenerated cellulose film is commercially manufactured by extrusion of viscose solution into an aqueous coagulating bath to form a film, clearing and washing the film impregnating the film with a plasticizing or softening agent, and drying the plasticized film. Such film is both water-permeable and water-sensitive and cannot be used as wrapping material where moisture resistance is required. Such film, therefore, is customarily provided with an organic moisture proofing topcoat so as to permit the film to be used in contact with moisture as in the packaging of moist substances. In other instances the topcoat is applied for decorative purposes, and more recently metal foil topcoats have been applied.

Organic water-proofing topcoat materials, when applied directly to untreated regenerated cellulose film, usually tend to slough off after prolonged contact with moisture. It has long been known that this sloughing off can be retarded by first applying a suitable anchoring resin to the regenerated cellulose film and then applying the topcoat.

The present invention principally rests upon the discovery that urea-formaldehyde-alkanepolyol resin is an excellent anchor agent in non-fibrous regenerated cellulose film for subsequently applied topcoat material. The invention further rests upon the discovery that such film can be prepared by impregnating at least one surface of the film with an aqueous solution of the resin in normally water-soluble thermosetting form and drying the film, the step of rendering the film apparently dry to the touch being sufficient to convert the resin into at least partially cured form. The topcoat material is then applied in normal manner.

The invention is illustrated in the drawing which is a vertical section shown schematically, of film prepared as described herein. The substrate is non-fibrous regenerated cellulose film impregnated with a non-anionic urea formaldehyde-polyhydroxy-substituted saturated acyclic hydrocarbon reaction product and carrying top coat material thereover.

The resin of the present invention is substantially non-ionic. The discovery came as a surprise for the reason that heretofore it had been generally supposed that anchoring agents, to be effective, must be either cationic or anionic.

The invention in preferred embodiments possesses the following particular advantages:

(1) The resin is water-white in color when viewed in bulk. Because of this, regenerated cellulose film undergoes no perceptible alteration in color when treated according to the present invention.

(2) The resin cures rapidly when the film is dried by heating at the minimum time and at minimum temperature employed in present day industrial practice. As result, no prolonged high temperature cure is necessary, permitting greater machine output. The resin is substantially non-ionic and thus the ionic properties of the film are at most little affected.

(3) The resin rapidly cures to hydrophobic form even when applied to the film at a neutral or alkaline pH. The film thus need not be subject to tendering on aging at an acid pH. However, the resin cures well on the acid side, so that the pH of the anchoring bath need not be controlled.

(4) The resin does not hydrophobe or precipitate in dilute aqueous solution, is stable in the presence of dissolved polyvalent anions including the sulfate and other polyvalent anions normally present in water as well as those delivered to the impregnating bath by freshly formed regenerated cellulose film, and cures satisfactorily in the presence of polyvalent anions. As a result, the resin of the present invention is particularly useful in continuous commercial processes for the manufacture of cellulosic film.

(5) The resin is compatible with the non-ionic water-soluble polyhydric alcohols commonly used for the plasticization of regenerated cellulose film and may be mixed with predominantly aqueous solutions thereof, for example aqueous glycerol solutions containing more than fifty percent by weight of water. Hence, the steps of plasticizing the film and impregnating the film with the anchoring resin may be combined.

(6) The polyol content of the anchoring resin acts as a softening agent when present in the film. It thus replaces an amount of softening agent which otherwise would be necessary, and thus does not constitute an item of additional expense.

According to a preferred embodiment suitable for commercial practice, the anchoring resin of the present invention is applied as follows.

A plasticizing bath is formed by dissolving a suitable plasticizer such as glycerol or other polyhydric alcohol in water. Ordinarily such a solution contains about 5% to 15%–20% by weight of the plasticizer. There is then added sufficient of an aqueous solution of the resin of the present invention to provide between about 0.01% and 2.5% of the resin based on the weight of the solution. The resin syrup employed in the present invention is normally supplied at an alkaline pH and baths prepared therefrom generally may be used without pH adjustment. I have found it preferable to adjust the pH of the anchoring bath to a value between about 6.5 and 7.5 as in this range the film after treatment is practically neutral yet the resin cures somewhat faster than at higher pH values.

If desired, however, the pH of the bath may be made acid down to about pH 3.5.

Regenerated cellulose film (preferably but not necessarily in wet swollen condition) is then passed through the bath. The film may be air dried at room temperature and this is sufficient to cure the resin to an initial hydrophobic (i.e., water-insoluble) gel form. However, the film is more advantageously dried over steam-heated rolls such as are customarily used in the manufacture of regenerated cellulosic film with development of bonding effect, and the temperature of the film during drying may be carried as high as 250° F. or higher so as to cure the resin substantially completely. Within the normal temperature range of 170° to 230 F. the film is usually dry to the touch in about one-half to five minutes and the resin has become sufficiently cured or hydrophobic that the film can be wound and stored in the form of large rolls without tendency to block. Since regenerated cellulosic film impregnated in the manner described typically picks up from about half to twice its weight of liquid, the finished film consists essentially of plasticized, non-fibrous regenerated cellulose film impregnated with between about 0.005% to 5% of its weight of the thermosetting substantially non-ionic urea-formaldehyde-alkanepolyol resin in thermocured hydrophobic form. The particular plasticizing material which is dissolved in the anchor resin solution and the amount thereof are not features of the present invention.

An organic moisture-proofing topcoat is then applied, and the film heated to dry the top coat. The final film thus consists of the foregoing resin-impregnated film bearing top coat material on either or both sides.

Amongst the topcoat materials which may be applied are those coating compositions containing as the film-forming constituent compounds such as nitrocellulose, cellulose acetate, methyl cellulose, polyethylene, deactylated chitin, rubber, chlorinated rubber, rubber hydrochloride, ethyl cellulose, butyl methacrylate, moisture-resistant lacquers, waxes such as montan wax, beeswax, carnauba wax, and in general conventional film-forming water-proofing materials. The topcoat may be metals including tin, aluminum and lead foil. The topcoat is not necessarily a continuous film, and may and often does consist of printed legends, revenue stamps, or decorative matter. The topcoat material may be applied by roller-coating, spraying, impregnation, etc. and may be applied in hot melt, organic solution or aqueous latex form.

Alternatively, the anchoring resin may be applied by other convenient means including spray or roller coater, and in certain instances only one surface need be treated with the resin.

The resin of the present invention is effective to some extent as an anchoring agent when in amount as little as 0.01% based on the dry weight of the film, so that there appears to be no minimum amount which will not produce some beneficial result. Commercially acceptable anchoring generally follows when the film contains about 0.1% by weight of the resin. Larger amounts usually effect somewhat better anchoring, and improvements have been noted as the concentration of the resin in the bath is increased to about 5%. In practice we prefer the treating solution to contain 0.1%–1% by weight of the resin, this range affording good anchoring while minimizing consumption of the resin, the film containing 0.2%–2% by weight of the material.

The anchoring resin of the present invention may be prepared by a variety of procedures, all of which, however, result in substantially the same resin.

One suitable method is to react urea and formaldehyde at an alkaline pH to form dimethylolurea or a low polymer thereof, acidify the mixture, add a suitable alkanepolyol, and continue the reaction at the acid pH until the reaction mixture has achieved a substantial viscosity short of the gel point yet is water-soluble and water-dilutable.

Alternatively, the urea, formaldehyde, and alkanepolyol may be premixed and reacted first at an alkaline pH until all of the formaldehyde has combined, and then at an acid pH until the hydrophilic resin state is attained. Still alternatively, a preformed aqueous dimethylol urea solution may be acidified, mixed with alkanepolyol and the mixture reacted as described.

The reaction is performed in aqueous medium. Commercial formalin (a 37% solution of formaldehyde in water) is preferred as the source of formaldehyde because of its ready availability, but formalin of greater and lesser strength, down to about 25% may also be used. Solid paraformaldehyde may be added and there may also be used solutions of formaldehyde in alcohol-water including solutions sold under the name of "Formcel," the alcohol acting to solubilize and stabilize the resin.

The condensation process generally involves heating the components at an alkaline pH followed by condensation to desirably large molecular weight at an acid pH, after which the syrup is rendered storage-stable by cooling and adjustment of the pH to an alkaline value. It is possible to eliminate the initial alkaline reaction and conduct the entire condensation on the acid side. The product is a complex polymer the configuration of which has not yet been determined and which is therefore most conveniently described in terms of its method of preparation.

As polyols employed for reaction with the urea-formaldehyde there may be employed any water-soluble non-ionic polyhydric alcohol, including ethylene glycol, glycerol, arabitol, mannitol, sorbitol, pentaerythritol, diethylene glycol and the various water-soluble polyol cellulose compounds.

The amount of alkanepolyol needed should be at least that which provides a water-soluble and stable condensation product, and the minimum amount in any particular instance may be determined by making a series of laboratory trials as illustrated in the examples below so as to form a high molecular weight hydrophilic, stable, water-dilutable resin. Employment of too little alkanepolyol results in transition of the resinous reaction product to the gel state without passage through a stage in which the reaction product is miscible with water in all proportions. The minimum effective amount of alkanepolyol is thus that which results in formation of a stable resinous condensate which is soluble in aqueous medium. Substantially more may be used without harm and often with benefit particularly from the point of view of stability. The addition of a small amount of a lower alkanol such as methanol or ethanol after completion of the reaction to assist dilutability is included in the scope of the present invention.

The preferred minimum amount of alkanepolyol is that which yields a resinous condensation syrup which is water-soluble initially and which remains water-soluble, without conversion to insoluble gel condition, for a desirably long period of time. Our laboratory results indicate that the addition of ½ to 1 mol of the alkanepolyol per mol of urea yields condensation products which are freely water-soluble in the absence of auxiliary solubilizing agents, which are very effective for anchoring purposes, and which have shelf lives in excess of one year. Laboratory evidence is also that about ⅙ mol is the least that can be profitably employed and that more than 3 mols is not required.

The practice of the process of the present invention can be extended so as to include the treatment of a variety of non-fibrous cellulosic films. The process may be applied to films of regenerated cellulose prepared from solutions of cellulose xanthates, cuprammonium cellulose, cellulose nitrate, cellulose acetate, cellulose acetobutyrate, and the like.

In the claims, the alkanepolyols referred to above are designated according to standard chemical terminology as polyhydroxy-substituted saturated acyclic hydrocarbons.

The invention will be further described in the following examples, which illustrate the invention, but are not to be construed as limitations thereon. Parts are by weight unless otherwise stated.

RESIN A

The following illustrates the preparation of a resin according to the present invention using ethylene glycol as the alkanepolyol, the glycol being added before acid polymerization of the initial urea-formaldehyde polymerization product.

A mixture of 240 gm. of urea (4 mols) and 681 gm. of 37% formaldehyde (8.4 mols) was adjusted to pH 9.4 and heated at 70°-75° C. for 25 minutes, forming dimethylol urea or a low polymer thereof. There was then added 180 gm. of ethylene glycol (2.9 mols), after which the pH of the mixture was adjusted to 3.9. The mixture was refluxed for one hour and the pH adjusted to 3.6. The solution was cooled at 45° C., and the pH adjusted to pH 2.5. The solution was maintained at 43°-45° C. for half an hour, cooled, and neutralized with triethanolamine. Its viscosity was I.

RESIN B

The following illustrates the preparation of a suitable anchor resin for practice of the present invention by a method wherein the alkane is added after dimethylol urea has been subjected to acid condensation.

120 gm. of urea (2.0 mols) and 341 gm. of 37% aqueous formalin (4.2 mols) were adjusted to pH 9.4 with 10% aqueous NaOH and heated at 70°-73° C. for 30 minutes. The solution was then adjusted to pH 4.6 with 20% aqueous acetic acid and refluxed for one hour, forming dimethylolurea or low polymer thereof. There was then added 106 gm. of diethylene glycol (1 mol) and the mixture refluxed until a water-soluble resin had formed, about 90 minutes being required. The solution was then cooled to room temperature. The pH of the solution was adjusted to 9.5 when its viscosity reached D on the Gardner-Holdt scale. The solution had a calculated solids content of 62%.

The sulfate ion stability of the resin was obtained by diluting a portion of the syrup to 5% solids (calculated) and titrating with 5% aqueous $Na_2SO_4$ solution to a constant turbidity end point. A value of 160 ml. was obtained, indicative of excellent polyvalent anion stability.

RESIN C

The following illustrates the preparation of a resin according to the method of Resin A employing a decreased amount of the polyol.

A mixture of 480 gm. of urea (8 mols) and 1362 gm. of 37% aqueous formalin (16.8 mols) was adjusted to pH 9.3 with aqueous NaOH and heated at 70°-75° C. for 30 minutes. There was then added 360 gm. of glycerol (3 mols) and the pH of the mixture adjusted to 4.1 with 18% aqueous HCl. The mixture was refluxed for one hour, maintained at 50° C. for 2.75 hours, cooled to room temperature, and neutralized with triethanolamine. Its viscosity was S.

RESIN D

The following illustrates preparation of a suitable resin using pentaerythritol as the polyol.

A mixture of urea (120 gm., 2 mols) and 37% formalin (325 gm., 4 mols) was adjusted to pH 9.5 and heated at 72°-75° C. for 30 minutes. There was then added 136 gm. (1 mol) of pentaerythritol. After 10 minutes the pH was adjusted to 3.9 with 10% aqueous HCl and the solution refluxed for one hour. The mixture was further reacted at 51°-54° C. for 25 minutes, cooled and neutralized with triethanolamine; its viscosity was H-I.

Examples 1-8

The foregoing resins were tested to determine their effectiveness as anchor agents for topcoat material by a standard laboratory procedure. According to this procedure, the test resins are added in amounts shown in the table below to 8% aqueous glycerol solutions so as to form combined anchoring-plasticizing baths. Sheet regenerated cellulose film is immersed in the bath for five minutes, wiped dry, drained, and clamped at the edges to prevent shrinkage. The film is oven dried at 200° F. for three minutes, stripped from the plates, conditioned for 14 days at 73° F. and 50% relative humidity, topcoated by dipping into a standard nitrocellulose solution corresponding to that of U.S. Patent No. 2,394,009, and oven-dried for ten minutes at 200° F. to set the lacquer.

Strips were cut from the resulting films, all edges of the films being freshly cut, and the strips immersed in water at 190° F. The resistance of the topcoat to sloughing was determined by removing the strips and rubbing them every few minutes between two fingers, separation of the topcoat from the cellulose film being readily detectable in this manner. Results were as follows:

| Resin | Combined Polyol In Resin | | Anchor-Plasticizing Bath | | Minutes to Slough in Water at 190° F. |
|---|---|---|---|---|---|
| | Name | Percent [1] | Mols [2] | Percent Resin [3] | pH [4] | |
| A | Glycol | 75 | 0.725 | 1.0 | 6.6 | >120 |
| B | DEG [5] | 100 | 0.5 | 0.1 | 6.6 | >120 |
| B | DEG | 100 | 0.5 | 1.0 | 6.7 | >120 |
| C | Glycerol | 75 | 0.375 | 1.0 | 7.0 | >120 |
| D | Penta [6] | 113 | 0.5 | 1.0 | 7.3 | >120 |

[1] Based on weight of urea.
[2] Per mol of urea.
[3] Calculated resin solids based on weight of solution.
[4] Initial.
[5] Diethylene glycol.
[6] Pentaerythritol.

I claim:

1. A process of treating non-fibrous regenerated cellulose film to improve its anchoring properties which comprises impregnating said film with an aqueous solution containing as anchoring agent between about 0.005% and 2.5% by weight of a substantially non-ionic, thermosetting, resinous reaction product of (A) one mol of urea, (B) between about 1.5 and 3 mols of formaldehyde, and (C) between ⅙ and 3 mols of a non-ionic water-soluble polyhydroxy-substituted saturated acyclic hydrocarbon as water-solubilizing and stabilizing component, and drying said film.

2. A process according to claim 1 wherein the impregnating solution has a substantially neutral pH.

3. A process according to claim 1 wherein the concentration of the resinous reaction product in the solution is between 0.01% and 2% by weight.

4. A process according to claim 1 wherein the film is dried at 150°-250° F. until the resinous reaction product has thermoset to an insoluble gel form.

5. A method of topcoating non-fibrous regenerated cellulose film which comprises impregnating said film with an aqueous solution containing as anchor agent between about 0.005% and 2.5% by weight of a substantially non-ionic, thermosetting, resinous reaction product of (A) one mol of urea, (B) between about 1.5 and 3 mols of formaldehyde, and (C) between ⅙ and 3 mols of a non-ionic water-soluble polyhydroxy-substituted saturated acyclic hydrocarbon as water-solubilizing and stabilizing component, drying said firm and converting said reaction product in said film to an insoluble gel form, and applying topcoat material to said film.

6. Non-fibrous regenerated cellulose film consisting essentially of plasticized, non-fibrous regenerated cellulose film impregnated with between about 0.02% to 5% of its weight of a normally thermosetting, resinous reaction product of (A) one mol of urea, (B) between about 1.5 and 3 mols of formaldehyde, and (C) between ⅙ and 3 mols, of a non-ionic water-soluble polyhydroxy-substituted saturated acyclic hydrocarbon as water-solubilizing and stabilizing component, said resin being in thermocured hydrophobic form.

7. Non-fibrous regenerated cellulose film consisting essentially of plasticized, non-fibrous regenerated cellulose film impregnated with between about 0.02% to 5% of its weight of a normally thermosetting, resinous reaction product of (A) one mol of urea, (B) between about 1.5 and 3 mols of formaldehyde, and (C) between 1/6 and 3 mols, of a non-ionic water-soluble polyhydroxy-substituted saturated acyclic hydrocarbon as water-solubilizing and stabilizing component, said resin being in thermocured hydrophobic form, said film bearing an organic moisture-proofing topcoat on at least one side.

References Cited in the file of this patent

UNITED STATES PATENTS

| | | |
|---|---|---|
| 2,168,477 | Hodgins | Aug. 8, 1939 |
| 2,185,167 | Hodgins | Dec. 26, 1939 |
| 2,329,651 | Powers et al. | Sept. 14, 1943 |
| 2,546,575 | Wooding | Mar. 27, 1951 |
| 2,709,146 | Berry et al. | May 24, 1955 |
| 2,728,688 | Wellisch | Dec. 27, 1955 |